(12) United States Patent
Ota (10) Patent No.: US 11,247,124 B2
(45) Date of Patent: Feb. 15, 2022

(54) COMPUTER SYSTEM, TERMINAL, AND DISTRIBUTION SERVER

(71) Applicant: KOEI TECMO GAMES CO., LTD., Kanagawa (JP)

(72) Inventor: Kenji Ota, Kanagawa (JP)

(73) Assignee: KOEI TECMO GAMES CO., LTD., Kanagawa (JP)

( * ) Notice: Subject to any disclaimer, the term of this patent is extended or adjusted under 35 U.S.C. 154(b) by 0 days.

(21) Appl. No.: 16/794,630

(22) Filed: Feb. 19, 2020

(65) Prior Publication Data
US 2020/0298109 A1    Sep. 24, 2020

(30) Foreign Application Priority Data

Mar. 20, 2019   (JP) .............................. JP2019-053104

(51) Int. Cl.
| | |
|---|---|
| *A63F 13/86* | (2014.01) |
| *A63F 13/35* | (2014.01) |
| *H04L 29/06* | (2006.01) |
| *A63F 13/71* | (2014.01) |
| *H04W 12/06* | (2021.01) |
| *A63F 13/5252* | (2014.01) |
| *A63F 13/792* | (2014.01) |

(52) U.S. Cl.
CPC .......... *A63F 13/35* (2014.09); *A63F 13/5252* (2014.09); *A63F 13/71* (2014.09); *A63F 13/792* (2014.09); *A63F 13/86* (2014.09); *H04L 63/0884* (2013.01); *H04L 63/105* (2013.01); *H04W 12/06* (2013.01)

(58) Field of Classification Search
CPC ............................. A63F 13/86; A63F 13/5252
See application file for complete search history.

(56) References Cited

U.S. PATENT DOCUMENTS

| | | | |
|---|---|---|---|
| 9,573,062 B1* | 2/2017 | Long ................... | A63F 13/5255 |
| 9,998,664 B1* | 6/2018 | Long .................. | H04N 5/23206 |
| 2014/0113718 A1* | 4/2014 | Norman ................ | A63F 13/497 |
| | | | 463/31 |
| 2014/0243082 A1* | 8/2014 | Harris ..................... | A63F 13/86 |
| | | | 463/31 |
| 2018/0133603 A1* | 5/2018 | Ninoles .............. | H04N 21/4781 |

(Continued)

FOREIGN PATENT DOCUMENTS

JP    2018-171283    11/2018

*Primary Examiner* — Jay Trent Liddle
(74) *Attorney, Agent, or Firm* — IPUSA, PLLC (57) ABSTRACT

A computer system includes a terminal, and a distribution server. The terminal includes an acquisition unit configured to acquire information related to a game played in a player game space, an image processing unit configured to generate second image information based on the information related to the game, a part of or entirety of the second image information being different from first image information that is displayed in the player game space, and a communication unit configured to transmit distribution information that includes the second image information. The distribution server includes a reception unit configured to receive the distribution information that includes the second image information, and a distribution unit configured to distribute distributable information that includes some or all of the second image information viewable on another terminal.

8 Claims, 9 Drawing Sheets

(56) References Cited

U.S. PATENT DOCUMENTS

| | | | |
|---|---|---|---|
| 2018/0192081 A1* | 7/2018 | Huang | H04N 13/117 |
| 2018/0280796 A1* | 10/2018 | Paradise | A63F 13/335 |
| 2019/0124383 A1* | 4/2019 | Ng | H04N 21/4788 |
| 2019/0192967 A1* | 6/2019 | Ogasawara | A63F 13/525 |
| 2019/0262705 A1* | 8/2019 | Trombetta | A63F 13/79 |
| 2019/0308107 A1* | 10/2019 | Kohler | A63F 13/86 |
| 2019/0358538 A1* | 11/2019 | Paradise | A63F 13/53 |
| 2020/0023280 A1 | 1/2020 | Onda et al. | |
| 2020/0105047 A1* | 4/2020 | Huang | A63F 13/335 |
| 2020/0197807 A1* | 6/2020 | Tieger | A63F 13/5258 |
| 2021/0023447 A1* | 1/2021 | Gentile | A63F 13/352 |
| 2021/0031115 A1* | 2/2021 | McCoy | A63F 13/67 |
| 2021/0093968 A1* | 4/2021 | McCoy | A63F 13/5252 |
| 2021/0093969 A1* | 4/2021 | McCoy | A63F 13/67 |

* cited by examiner

COMPUTER SYSTEM, TERMINAL, AND DISTRIBUTION SERVER

CROSS-REFERENCE TO RELATED APPLICATIONS

This application is based on and claims priority to Japanese Patent Application No. 2019-053104, filed on Mar. 20, 2019, the entire contents of which are incorporated herein by reference.

BACKGROUND OF THE INVENTION

1. Field of the Invention

The disclosures herein relate to a computer system, a terminal, and a distribution server.

2. Description of the Related Art

"eSports" gameplay images are distributed to viewers who are widely amassed to watch gameplay by players. Patent Document 1 proposes a system in which, when a viewer performs a predetermined gift operation, an item selected from items possessed by the viewer or an item purchased by the viewer is given to a player selected as a recipient. Further, when the player uses the received item, a special benefit is provided to the viewer who gave the item.

However, it would be difficult for the viewer to understand game situations from different points of view from those of the player because the viewer is watching the same gameplay images as the player.

RELATED-ART DOCUMENTS

Patent Documents

Patent Document 1: Japanese Laid-open Patent Publication No. 2018-171283

SUMMARY OF THE INVENTION

The present invention provides a technique that makes game viewing more attractive.

According to an embodiment of the present invention, a computer system includes a terminal, and a distribution server. The terminal includes an acquisition unit configured to acquire information related to a game played in a player game space, an image processing unit configured to generate second image information based on the information related to the game, a part of or entirety of the second image information being different from first image information that is displayed in the player game space, and a communication unit configured to transmit distribution information that includes the second image information. The distribution server includes a reception unit configured to receive the distribution information that includes the second image information, and a distribution unit configured to distribute distributable information that includes some or all of the second image information viewable on another terminal.

BRIEF DESCRIPTION OF THE DRAWINGS

Other objects and further features of the present invention will be apparent from the following detailed description when read in conjunction with the accompanying drawings, in which.

DESCRIPTION OF THE EMBODIMENTS

In the following, embodiments of the present invention will be described with reference to the accompanying drawings. In the specification and drawings, elements having substantially the same configurations are denoted by the same reference numerals, and a duplicate description thereof will be omitted.

[Computer System]

Figure 1:
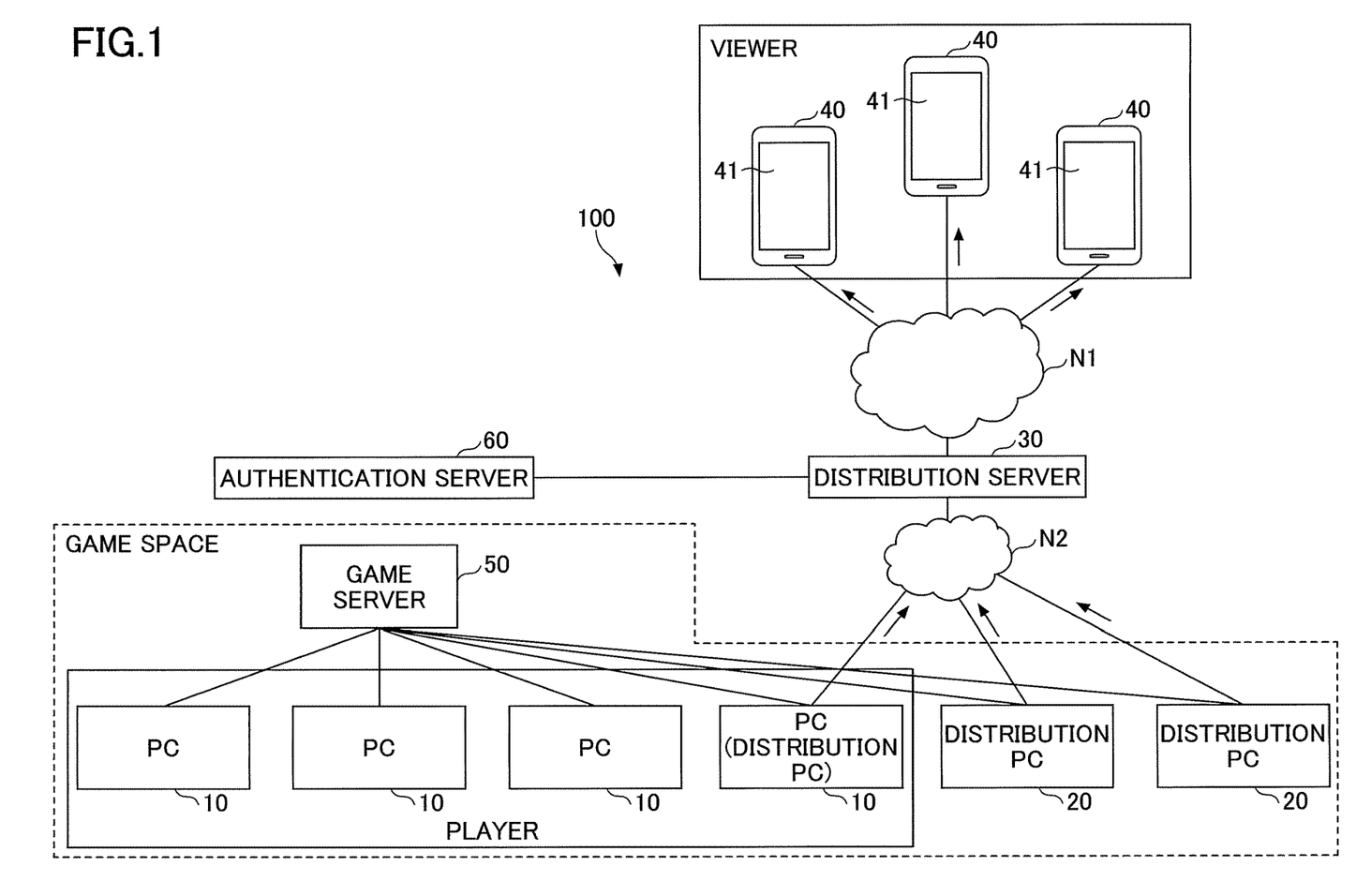
FIG. 1 is a diagram illustrating an example of a configuration of a computer system according to an embodiment.

FIG. 1 is a diagram illustrating an example of a configuration of a computer system according to an embodiment. A computer system 100 according to the present embodiment is a combination of an eSports play system for creating a game space, and an eSports viewing system for watching gameplay in the game space. The computer system 100 includes a server and a plurality of user terminals capable of data communication with each other via communication lines N1 and N2. In FIG. 1, a distribution server 30 is illustrated as an example of the server. Further, personal computers (hereinafter referred to as "PC(s) 10"), distribution personal computers (hereinafter referred to as "distribution PC(s) 20"), and smartphones 40 are illustrated as examples of the user terminals. Note that communication channels between the game server 50 and the PCs 10 and the distribution PCs 20 are omitted.

"eSports" is an abbreviation for electronic sports. Among registered users related to a game title, one or more users are set as "players", and one or more users are set as "viewers". In order for the viewers to "watch eSports", a game played by the players on player terminals (the PCs 10 in FIG. 1) is output to viewer terminals (such as displays 41 of the smartphones 40 in FIG. 1).

The computer system 100 according to the present embodiment collects, generates, and distributes information required for eSports viewing. The communication lines N1 and N2 are communication channels capable of data communication. Examples of the communication lines N1 and N2 include a communication network such as a local area network (LAN) using a dedicated line (dedicated cable) or Ethernet (registered trademark) for direct connection, a telecommunication network, a cable network, and the Internet. Further, the communication method may be a wired communication method or a wireless communication method.

The computer system 100 includes the game server 50 that provides, as online games, game titles to be distributed as eSports. The PCs 10 used by one or more users (players) are connected to the game server 50. In addition, the distribution PCs 20 are connected to the game server 50. The PCs 10 and the distribution PCs 20 acquire data of a game played on the players' PCs 10 from the game server 50. Based on the game data, the PCs 10 generate and display image information (hereinafter also referred to as "first image information") displayed in the players' game space. Further, the distribution PCs 20 generate image information (hereinafter also referred to as "second image information") based on the game data, and transmit the second image information to the distribution server 30 for eSports viewing. The game data may include the players' positions, hit points, and actions. The game data is an example of information related to a game played in the game space. The distribution PCs 20 create the second image information that is partially or entirely different from the first image information, and transmit distribution information including the second image information to the distribution server 30.

The distribution server 30 collects distribution information required for eSports viewing, and provides the collected distribution information to the viewers' smartphones 40. Specifically, the distribution server 30 divides viewers into clusters based on paying and non-paying information, preliminarily sets a viewing permission level on a per-cluster basis, and provides distribution information to each of the smartphones 40 in accordance with a corresponding viewing permission level.

The second image information, which is an example of distribution information, generated by the distribution PCs 20 may be an image that is partially or entirely different from the first image information displayed on the PCs 10, such as an image displaying a map that allows a viewer to view overall game situations. Further, the second image information may be an image that is partially different from the first image information, such as an image in which a part (e.g., an obstacle) of the first image information is made semi-transparent or transparent. In this manner, the distribution PC 20 generates the second image information by adding value related to a game based on game data received from the game server 50, and transmits the generated second image information to the distribution server 30 as distribution information. The distribution PCs 20 may include sound information such as players' voice chat in the distribution information, and transmit the distribution information to the distribution server 30. In this case, based on information related to the game, the distribution PC 20 generates second sound information that is partially or entirely different from first sound information that is output in the players' game space. In this case, the distribution information including the second image information and the second sound information is transmitted to the distribution server 30.

The distribution server 30 is connected to an authentication server 60, and provides distribution information to the smartphones 40 successfully authenticated by the authentication server 60. An authentication process performed by the authentication server 60 may use IDs, passwords, or accounts of registered users of the smartphones 40.

The distribution server 30 changes distribution information to be delivered to the smartphones 40 in accordance with the viewing permission levels set for the smartphones 40. However, the distribution server 30 may provide the same distribution information to all the successfully authenticated smartphones 40. Further, the distribution server 30 may provide the same distribution information to all the successfully authenticated smartphones 40 for a predetermined period of time, and may provide different distribution information in accordance with the viewing permission levels for a period of time other than the predetermined period of time.

The game server 50 includes various types of microprocessors such as a central processing unit (CPU), a graphics processing unit (GPU), and a digital signal processor (DSP), various types of IC memories such as a VRAM, a RAM, and a ROM, and a communication device.

The game server 50 has a user management function related to user registration, and also a game management function to manage the control of a game played on the players' PCs 10 by providing the PCs 10 and the distribution PCs 20 with game data required for the gameplay. The game server 50 implements the user management function and the game management function by causing the CPU to perform an arithmetic process based on a predetermined program and data. Note that the functions implemented by the game server 50 are not limited thereto. The functions implemented by the game server 50 may be omitted or other functions may be added as necessary.

As functions related to eSports viewing, the distribution server 30 has a function to register players' and viewers' settings, and a function to collect view charges. The distribution server 30 also has a function to collect distribution information for allowing viewers to watch eSports on electronic devices such as the viewers' smartphones 40. Further, the distribution server 30 has a function to divide viewers into clusters, and to determine whether or not to distribute distribution information in accordance with the viewing permission level set on a per-cluster basis. Note that the functions implemented by the distribution server 30 are not limited thereto. The functions implemented by the distribution server 30 may be omitted or other functions may be added as necessary.

The distribution server 30 implements a function to distribute distribution information to the viewer's smartphones 40 by causing the CPU to perform an arithmetic process based on a predetermined program and data. However, the distribution function of the distribution server 30 is not limited thereto. The distribution function may be omitted or other functions may be added as necessary.

As briefly described above, the computer system 100 according to the present embodiment is a content providing system that mainly provides two kinds of content, namely online games provided by the game server 50 and eSports viewing provided by the distribution server 30.

In FIG. 1, the game server 50 and the distribution server 30 are illustrated as separate servers; however, the present invention is not limited thereto. The computer system 100 may include one server equipped with the functions of the game server 50 and the functions of the distribution server 30. Further, in FIG. 1, the distribution server 30 and the authentication server 60 are illustrated as separate servers; however, the present invention is not limited thereto. One server equipped with the functions of the distribution server 30 and the functions of the authentication server 60 may be used.

The PCs 10 are examples of player terminals. The PCs 10 are computers used by users registered in the game server 50 as game players, and are electronic devices capable of accessing the game server 50 via communication lines to play an online game. The electronic devices used by players to play games are not limited to personal computers such as the PCs 10, and may be portable game consoles, game controllers, tablet computers, wearable computers, or commercial game consoles.

The distribution PCs 20 are examples of terminals that acquire information of a game played in the game space. In other words, the distribution PCs 20 are electronic devices that acquire information of a game played in the game space, that is, game data, via communication lines. The distribution PCs 20 create distribution information from the acquired game data, and transmit the distribution information to the distribution server 30. The PCs 10 may function as the distribution PCs 20 by being equipped with the functions of the distribution PCs 20. The terminals that acquire information about a game are not limited to personal computers such as the distribution PCs 20. The terminals may be portable game consoles, game controllers, tablet computers, wearable computers, or commercial game consoles.

The smartphones 40 are examples of viewer terminals. The smartphones 40 are computers used by users registered in the distribution server 30 as viewers, and are electronic devices capable of accessing the authentication server 60 via communication lines to watch an online game. The viewer terminals are not limited to the smartphones 40, and may be personal computers, portable game consoles, game controllers, tablet computers, wearable computers, or commercial game consoles.

In the following, configurations of a distribution PC 20 and the distribution server 30, and also operations performed by the distribution PC 20 and the distribution server 30 to provide content, mainly eSports content, to the smartphones 40 will be described.

[Hardware Configuration of Distribution PC]

Figure 2:
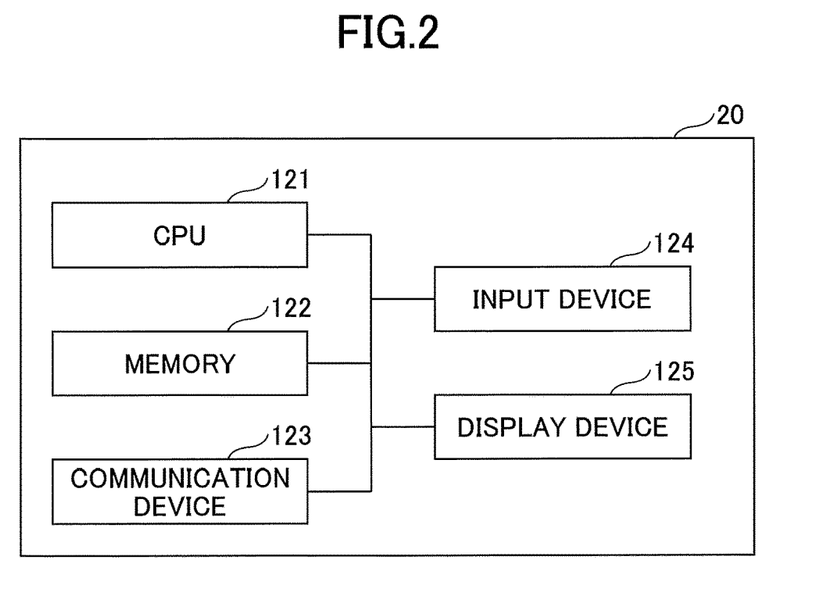
FIG. 2 is a diagram illustrating an example of a hardware configuration of a distribution PC according to the embodiment.

A hardware configuration of the distribution PC 20 will be described with reference to FIG. 2. FIG. 2 is a diagram illustrating an example of the hardware configuration of the distribution PC 20. The distribution PC 20 includes a CPU 121, a memory 122, a communication device 123, an input device 124, and a display device 125. The CPU 121 controls the distribution PC 20. The memory 122 is, for example, a storage medium such as a memory that can be directly accessed by the CPU 121 and is included in the distribution PC 20. The communication device 123 is a communication device such as a network circuit that controls communication. The input device 124 is an input device such as a camera or a touch panel. The display device 125 is an output device such as a display or a speaker.

[Hardware Configuration of Distribution Server]

Figure 3:
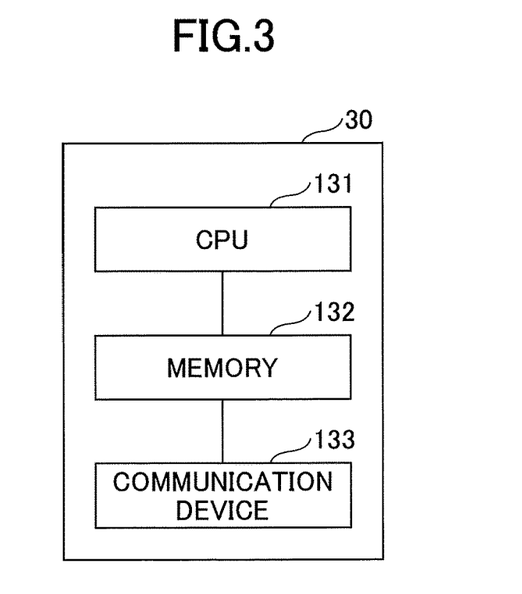
FIG. 3 is a diagram illustrating an example of a hardware configuration of a distribution server according to the embodiment.

Next, a hardware configuration of the distribution server 30 will be described with reference to FIG. 3. FIG. 3 is a diagram illustrating an example of the hardware configuration of the distribution server 30. The distribution server 30 includes a CPU 131, a memory 132, and a communication device 133. The CPU 131 controls the distribution server 30. The memory 132 is, for example, a storage medium such as a memory that can be directly accessed by the CPU 131 and is included in the distribution server 30. The communication device 133 is a communication device such as a network card that controls communication.

[Functional Configuration of Distribution PC]

Figure 4:
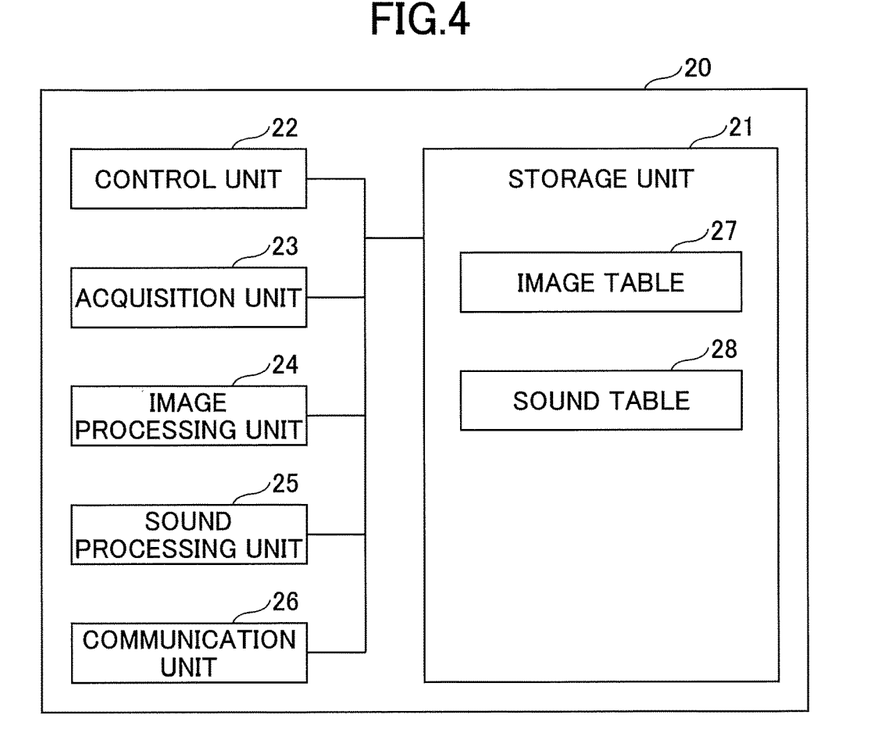
FIG. 4 is a diagram illustrating an example of a functional configuration of the distribution PC according to the embodiment.

Next, a functional configuration of the distribution PC 20 will be described with reference to FIG. 4. FIG. 4 is a diagram illustrating an example of the functional configuration of the distribution PC 20. The distribution PC 20 includes a storage unit 21, a control unit 22, an acquisition unit 23, an image processing unit 24, a sound processing unit 25, and a communication unit 26. The storage unit 21 stores an image table 27 and a sound table 28. The storage unit 21 is implemented by the memory 122. Note that the image table 27 and the sound table 28 may be stored in a cloud storage device, instead of the storage unit 21.

The acquisition unit 23 acquires, from the game server 50, game data required for gameplay on the players' PCs 10.

The control unit 22 performs overall control of the distribution PC 20. The control unit 22 is implemented by causing the CPU 121 to perform a process defined in a predetermined program.

The image processing unit 24 generates viewing information based on the game data. An image generated by the image processing unit 24 is an example of the second image information that is generated from the game data and is partially or entirely different from the first image information generated from the game data by the PCs 10. The second image information may be an image generated by processing a part of the first image information, or may be an image that is completely different from the first image information. The second image information may include additional information indicating game situations, which are not included in the first image information. Further, the additional information may be image information, or may be text information such as characters or symbols. Further, the second image information may be a video, a moving image, or a still image of a game. For example, the second image information generated by the image processing unit 24 may display a map that allows a viewer to view overall game situations. Further, the second image information generated by the image processing unit 24 may be an image in which a part (e.g., an obstacle) of the first image information is made semi-transparent or transparent. Further, the second image information generated by the image processing unit 24 may include a plurality of pieces of first image information.

The sound processing unit 25 generates sound information. For example, the sound processing unit 25 may generate a single sound or may combine a plurality of sounds based on the acquired game data. A sound generated by the sound processing unit 25 is sound information (hereinafter referred to as "second sound information") that is partially or entirely different from sound information (hereinafter referred to as "first sound information") generated from the game data by the PCs 10. An example of the second sound information is players' voice chat.

The communication unit 26 transmits distribution information including the second image information to the distribution server 30. The communication unit 26 may also include second sound information in the distribution information, and transmits the distribution information including the second image information and the second sound information to the distribution server 30.

The functions of the distribution PC 20 as illustrated in FIG. 4 are implemented by a combination of operations of hardware illustrated in FIG. 2. For example, the functions of the distribution PC 20 are implemented by a combination of hardware operations such as loading a predetermined program into hardware such as the memory 122, reading and writing data stored in the memory 122, and performing communication through the communication device 123, as controlled by the CPU 121.

The functions of the control unit 22 are implemented by causing the CPU 121 to perform a process defined in a predetermined program. The predetermined program is stored in the memory 122 and controls the entire distribution PC 20. The functions of the acquisition unit 23, the image processing unit 24, and the sound processing unit 25 are implemented by causing the CPU 121 to perform a program stored in the memory 122. The functions of the communication unit 26 are implemented by causing the CPU 121 to perform a program stored in the memory 122 and to control the communication device 123.

[Functional Configuration of Distribution Server]

Figure 5:
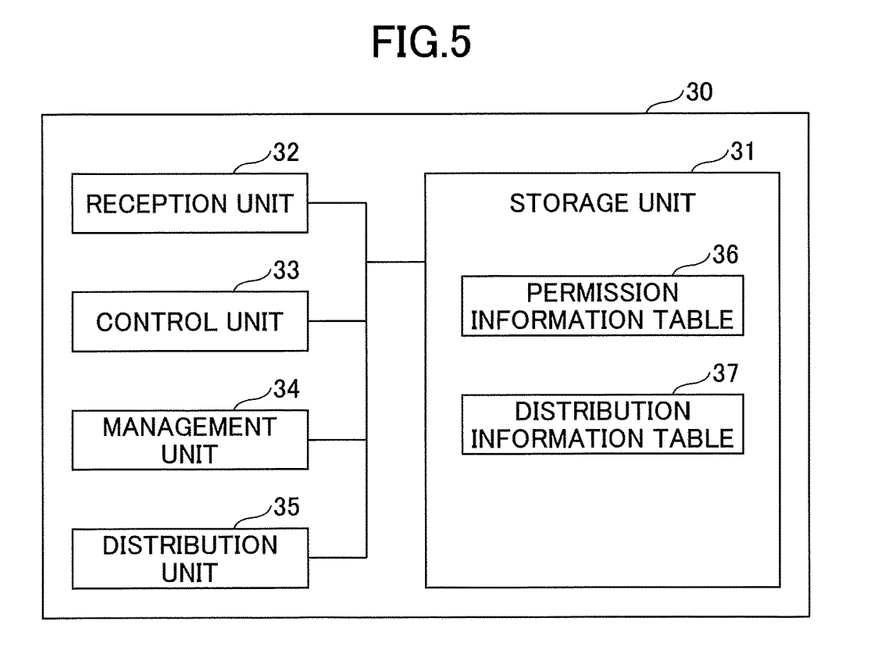
FIG. 5 is a diagram illustrating an example of a functional configuration of the distribution server according to the embodiment.

Next, a functional configuration of the distribution server 30 will be described with reference to FIG. 5. FIG. 5 is a diagram illustrating an example of the functional configuration of the distribution server 30. The distribution server 30 includes a storage unit 31, a reception unit 32, a control unit 33, a management unit 34, and a distribution unit 35. The storage unit 31 stores a permission information table 36 and a distribution information table 37. The storage unit 31 is implemented by the memory 132. The permission information table 36 and the distribution information table 37 may be stored in a cloud storage device, instead of the storage unit 31.

Figure 6:
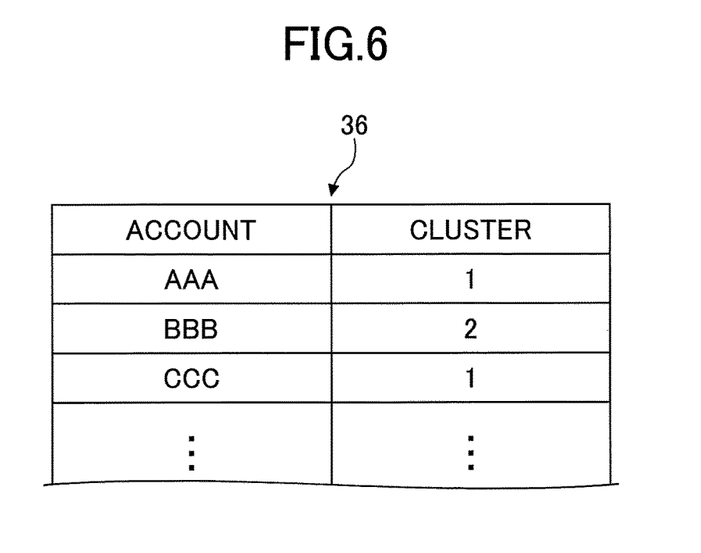
FIG. 6 is a table illustrating an example of a permission information table according to the embodiment.

FIG. 6 illustrates an example of the permission information table 36. The permission information table 36 preliminarily registers a viewing permission level set for each of the viewers' smartphones 40 that have sent requests to watch a game, from among registered users. The permission information table 36 of FIG. 6 stores accounts associated with clusters. Each of the accounts is an example of identification information for identifying a smartphone 40. A smartphone 40 having an account "AAA" belongs to a cluster "1", a smartphone 40 having an account "BBB" belongs to a cluster "2", and a smartphone 40 having an account "CCC" belongs to the cluster "1". For example, the viewing permission levels are set for the viewers' smartphones 40 that have been divided into clusters based on, for example, paying and non-paying information, and are registered in the permission information table 36.

Figure 7:
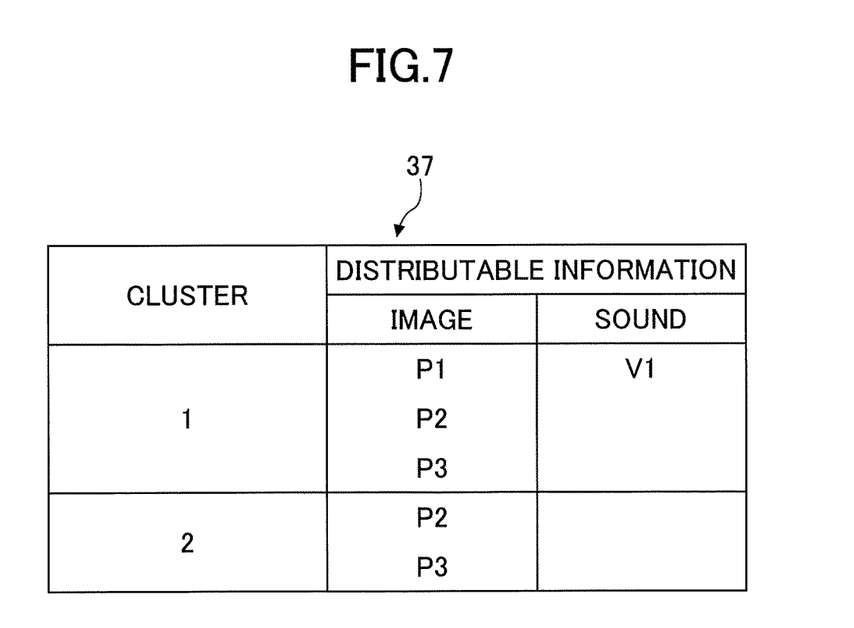
FIG. 7 is a table illustrating an example of a distribution information table according to the embodiment.

FIG. 7 illustrates an example of the distribution information table 37. The distribution information is grouped into the clusters, and is stored in the distribution information table 37 as distributable information that can be distributed on a per-cluster basis. For example, second images P1, P2, and P3 and a second sound V1, set in the distribution information table 37, can be distributed to viewers' smartphones belonging to the cluster "1". In addition, only the second images P2 and P3, set in the distribution information table 37, can be distributed to viewers' smartphones 40 belonging to the cluster "2", while the second image P1 and the second sound V1, which can be distributed to the viewers' smartphones belonging to the cluster "1", are not distributed to the viewers' smartphones 40 belonging to the cluster "2".

Referring back to FIG. 5, the reception unit 32 receives the distribution information transmitted from the distribution PC 20. The control unit 33 controls the entire distribution server 30.

The management unit 34 selects distributable information for a smartphone 40 that has sent a request to watch a game, in accordance with the viewing permission level set for the smartphone 40. Accordingly, the management unit 34 can manage what image information and sound information to distribute to a viewer in accordance with the cluster to which the viewer's terminal belongs.

The distribution unit 35 distributes the distributable information selected by the distribution unit 35.

The functions of the distribution server 30 as illustrated in FIG. 5 are implemented by a combination of operations of hardware illustrated in FIG. 3. For example, the functions of the distribution server 30 are implemented by a combination of hardware operations such as loading a predetermined program into hardware such as the memory 132, reading and writing data stored in the memory 132, and performing communication through the communication device 133, as controlled by the CPU 131.

The functions of the control unit 33 are implemented by causing the CPU 131 to perform a process defined in a program. The program is stored in the memory 132 and controls the entire distribution server 30. The functions of the reception unit 32 and the management unit 34 are implemented by causing the CPU 131 to perform a program, which controls distribution, stored in the memory 132.

The functions of the distribution unit 35 are implemented by causing the CPU 131 to perform a program stored in the memory 132 and to control the communication device 133 in accordance with the program.

Note that the hardware configuration of a smartphone 40 is the same as the hardware configuration (see FIG. 2) of the distribution PC 20, and a description thereof will be omitted. Further, the smartphone 40 includes functions at least the same as the storage unit 21, the control unit 22, the acquisition unit 23, and the communication unit 26 included in the functional configuration (see FIG. 4) of the distribution PC 20. In response to a request from a control unit of the smartphone 40, the smartphone 40 displays distributable information, acquired by an acquisition unit via a communication unit, on a display 41 (see FIG. 1).

[Operations of Distribution PC and Distribution Server]

Figure 8:
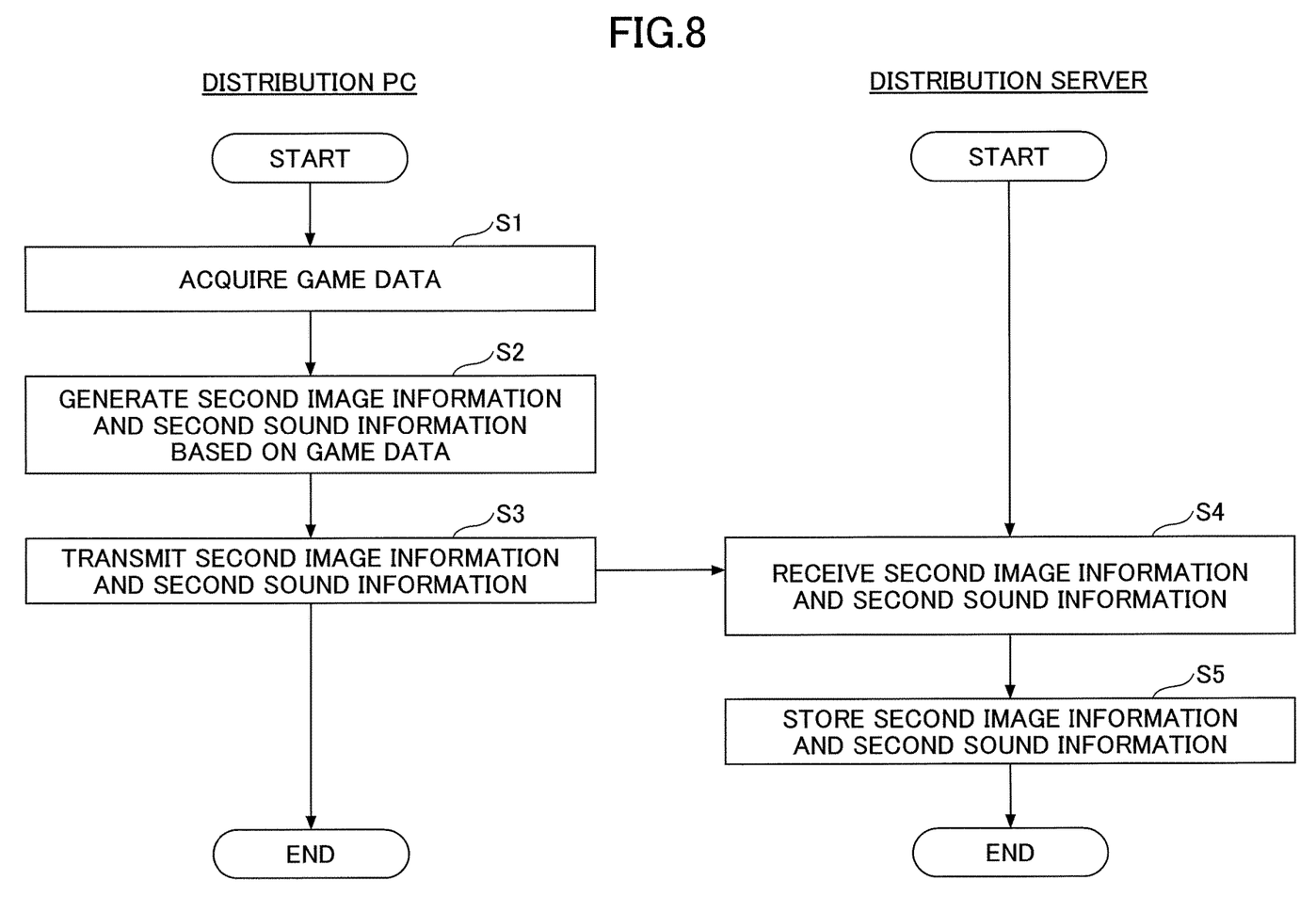
FIG. 8 is a flowchart illustrating a process performed by the distribution PC and the distribution server according to the embodiment.

Next, operations of the distribution PC 20 and the distribution server 30 will be described with reference to FIG. 8. FIG. 8 is a flowchart illustrating a process performed by the distribution PC 20 and the distribution server 30 according to the embodiment. The process illustrated in FIG. 8 is performed, for example, at a time when the game server 50 starts to provide game content to the PCs 10.

First, the acquisition unit 23 of the distribution PC 20 acquires game data from the game server 50 via the communication unit 26 (step S1).

Next, the image processing unit 24 and the sound processing unit 25 generate second image information and second sound information based on the game data (step S2). Note that the second image information or the second sound information is not required to be generated as appropriate. The second image information is stored in the image table 27, and the second sound information is stored in the sound table 28.

Next, the communication unit 26 transmits distribution information including the generated second image information and the generated second sound information to the distribution server 30 (step S3). Note that the distribution information transmitted from the communication unit 26 may include either the second image information or the second sound information. After step S3 is complete, the above-described process performed by the distribution PC 20 ends.

The reception unit 32 of the distribution server 30 receives the distribution information including the second image information and the second sound information from the distribution PC 20 (step S4), groups the distribution information into the clusters, and stores the distribution information as distributable information in the distribution information table 37 (step S5). After step S5 is complete, the above-described process performed by the distribution server 30 ends.

[Operations of Smartphone and Distribution Server]

Figure 9:
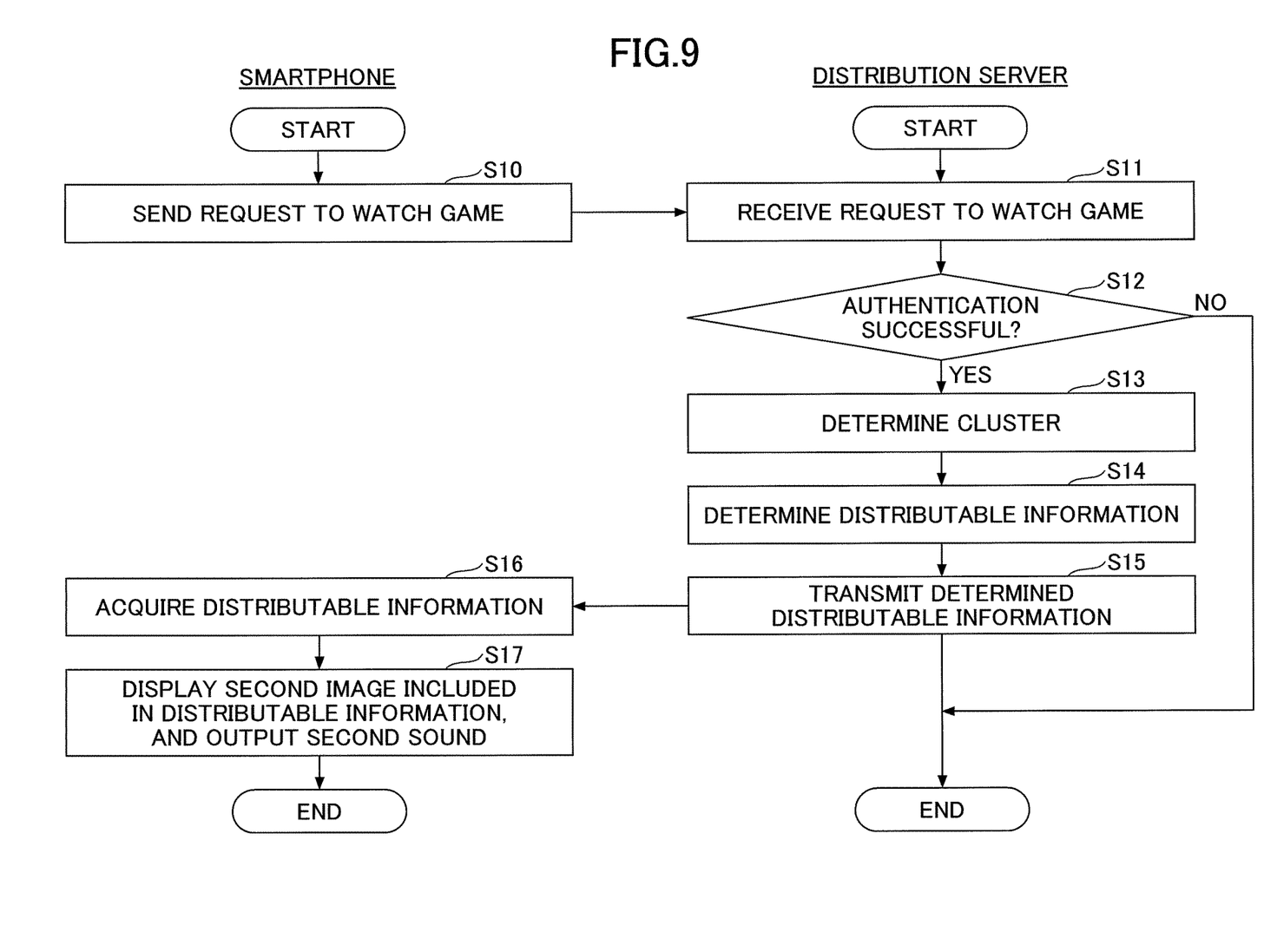
FIG. 9 is a flowchart illustrating a process performed by a smartphone and the distribution server according to the embodiment.

Operations of a smartphone 40 and the distribution server 30 will be described with reference to FIG. 9. FIG. 9 is a flowchart illustrating a distribution process performed by the smartphones 40 and the distribution server 30 according to the embodiment. The process illustrated in FIG. 9 is performed, for example, at a time before or after the game server 50 starts to provide a game to the PCs 10.

First, the smartphone 40 sends a request to watch a game (step S10). Next, the reception unit 32 of the distribution server 30 receives the request to watch the game (step S11).

Next, the control unit 33 determines whether the smartphone 40 is successfully authenticated based on an authentication result obtained from the authentication server 60 (step S12). For example, based on a user ID, a password, or an account input on the smartphone 40, the authentication server 60 authenticates a user of the smartphone 40 as a registered user who can watch the game.

If the control unit 33 determines that the authentication failed based on the authentication result obtained from the authentication server 60, the process ends. Conversely, if the control unit 33 determines that the authentication is successful based on the authentication result obtained from the authentication server 60, the management unit 34 determines a cluster based on the account of the authenticated smartphone 40 (step S13). Note that the account is merely an example of information for identifying the smartphone 40, and any other information capable of identifying the smartphone 40 may be utilized.

Next, the management unit 34 determines distributable information based on the determined cluster by referring to the distribution information table 37 (step S14). Next, the distribution unit 35 transmits the determined distributable information to the smartphone 40 that has sent the request to watch the game (step S15). After step S15 is complete, the above-described process performed by the distribution server 30 ends.

Next, the smartphone 40 acquires the distributable information transmitted from the distribution server 30 (step S16). Next, the smartphone 40 displays a second image included in the distributable information on a display 41. If a second sound is included in the distributable information, the smartphone 40 outputs the second sound to a speaker (step S17). After step S17 is complete, the above-described process performed by the smartphone 40 ends.

According to the above-described computer system 100, only viewers can view images and sounds that are not viewable to players of a game, thereby allowing the viewers to watch the game with great excitement. Accordingly, it is possible to provide more attractive game viewing.

Figure 10:
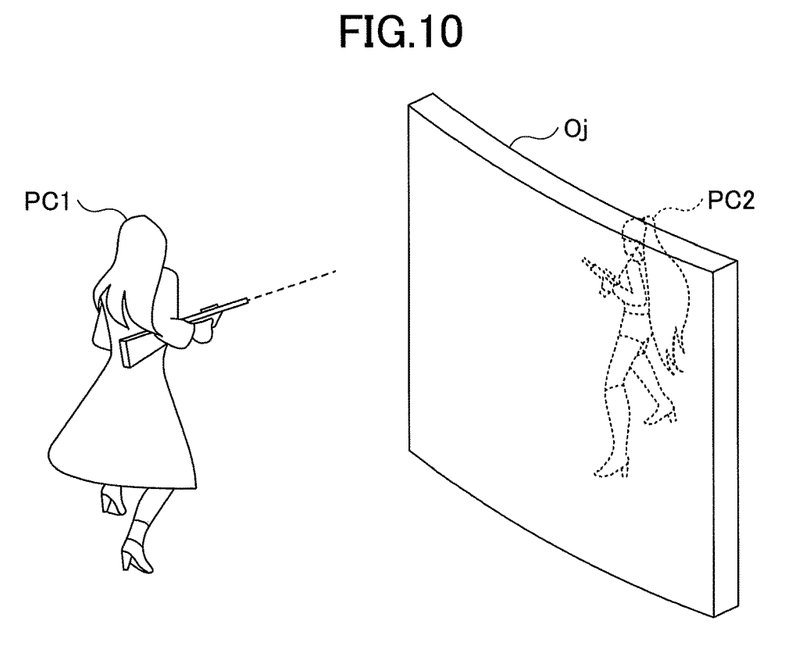
FIG. 10 is an example of a distribution image according to the embodiment.

For example, in a fighting game, an image viewed by a player as illustrated in FIG. 10 is assumed to be a first image. In this case, an opponent's character PC2 is behind an obstacle wall Oj when viewed from a player character PC1 controlled by the player, and the character PC2 is not visible to the player. On the player's PC 10, images only from the player's point of view are displayed. Namely, first images include images only from the player's point of view.

Figure 11:
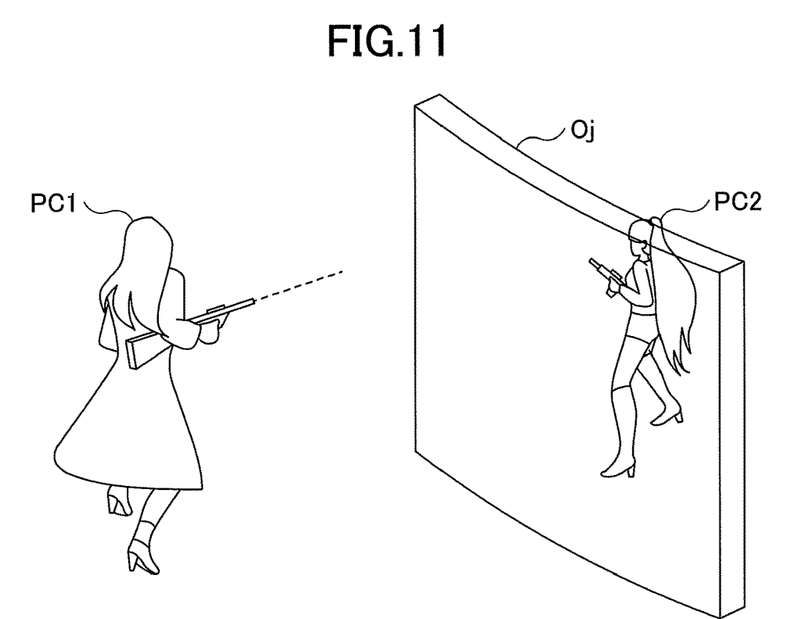
FIG. 11 is an example of a distribution image according to the embodiment.

Conversely, as illustrated in the example of FIG. 11, in a generated second image, the wall Oj that is a part of the first image is made transparent. Therefore, a viewer who received the second image can see the opponent's character PC2 behind the wall Oj, which is not visible on the player's PC 10. Accordingly, it is possible to make game viewing more attractive and enhance the viewer's excitement.

Figure 12:
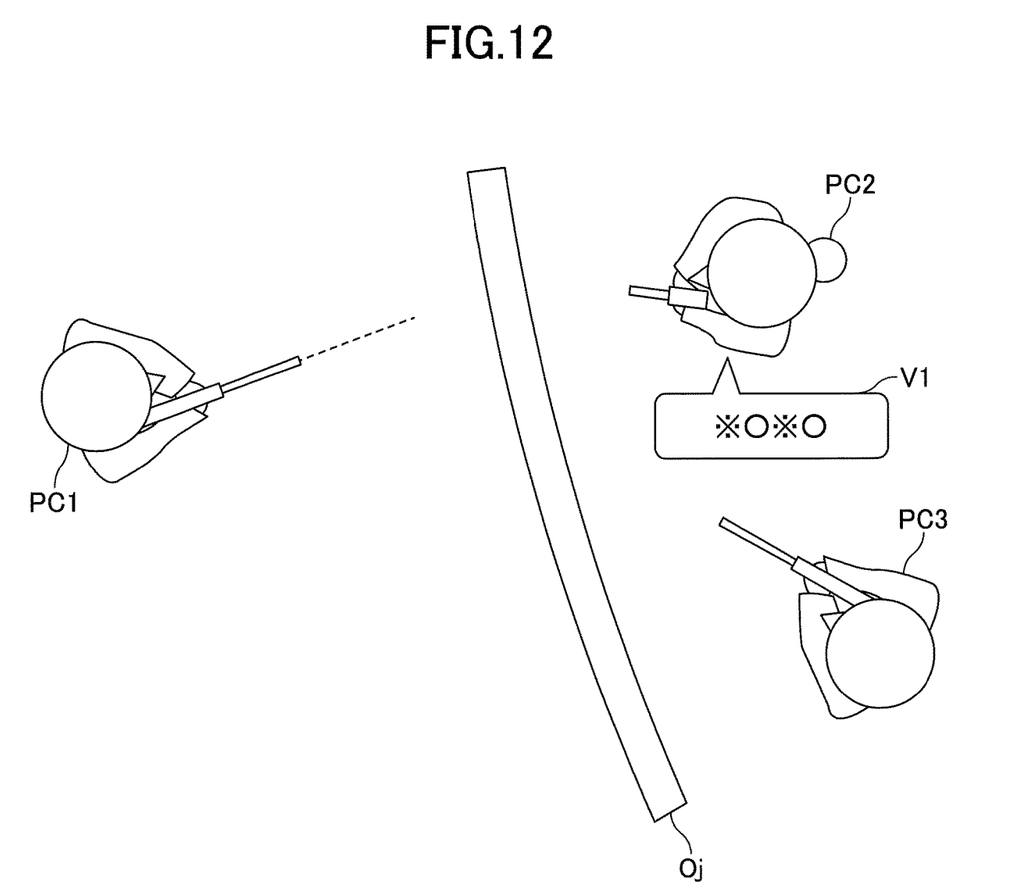
FIG. 12 is an example of a distribution image according to the embodiment.

Further, as illustrated in the example of FIG. 12, if a second image allowing a viewer to view overall game situations is generated based on a first image, the viewer can understand more detailed game situations in real time. Accordingly, it is possible to make game viewing more attractive and further enhance the viewer's excitement.

If distributable information acquired by the smartphone 40 from the distribution server 30 includes a sound V1, the sound V1 is output as illustrated in FIG. 12. Alternatively, instead of the sound V1, characters corresponding to the sound V1 may be displayed on a display.

Accordingly, viewers can view overall game situations, see images not visible to players, and hear the players' voice chat. This allows the viewers not only to look on the same video as the players, but also to enjoy gameplay from points of view other than the players' points of view. As a result, more attractive video game content can be distributed.

[Variation]

Figure 13:
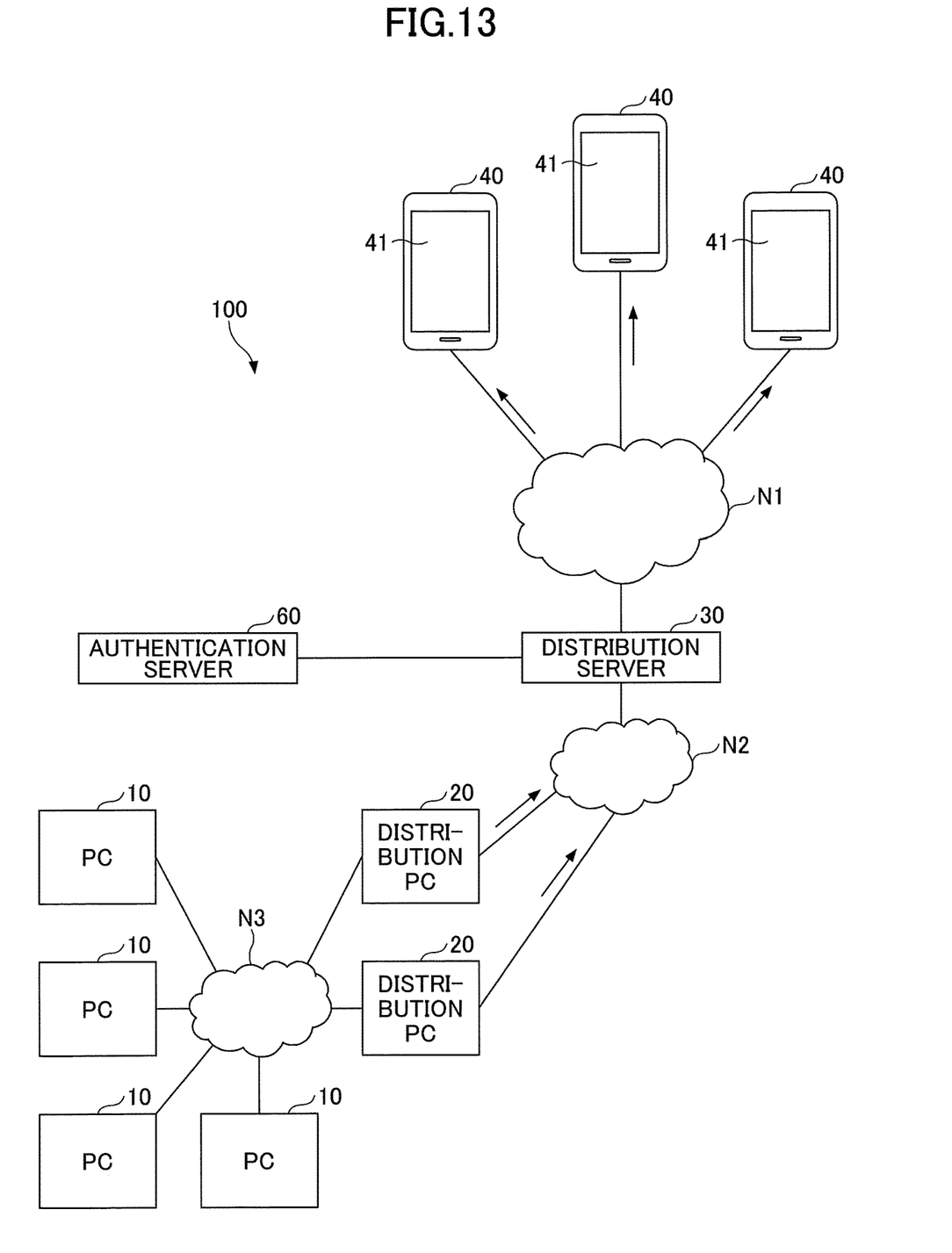
FIG. 13 is a diagram illustrating an example of a computer system according to a variation of the embodiment.

A computer system 100 according to a variation of the embodiment will be described. FIG. 13 is a diagram illustrating an example of the computer system 100 according to the variation of the embodiment. The computer system 100 according to the variation differs from the computer system 100 according to the embodiment in that the computer system 100 according to the variation does not include the game server 50. Other configurations of the computer system 100 according to the variation are the same as those of the computer system 100 according to the embodiment.

In the variation, the plurality of PCs 10 and the plurality of distribution PCs 20 are connected to each other via a communication line N3, thus providing a peer-to-peer (P2P) system configuration. The PCs 10 and the distribution PCs 20 communicate with each other, and share game images and sounds.

In the above configuration, the processes illustrated in the flowcharts of FIG. 8 and FIG. 9 can be performed by the distribution PCs 20, the distribution server 30, and the smartphones 40. Accordingly, viewers can not only look on a video game played by players, but also enjoy the video game from points of view other than the players' points of view.

In the embodiments and the variation described above, the contents of distributable information vary for each viewing permission level, namely for each cluster level set in the permission information table 36; however, the present invention is not limited thereto. For example, the distribution server 30 is not required to include the permission information table 36, and may transmit the same distributable information to all the authenticated smartphones 40.

According to an aspect of the present invention, it is possible to provide more attractive game viewing.

It is to be understood that the computer system, the terminals, and the servers according to the disclosed embodiments are exemplary and are not restrictive in all respects. The embodiments described above can be modified and improved in various forms without departing from the appended claims and the spirit thereof. The matters described in the above-described embodiments can be combined to an extent consistent with other configurations.

What is claimed is:

1. A computer system comprising:
a first terminal; and
a distribution server,
wherein the first terminal includes:

a first processor that is configured to:
acquire information related to a game played in a player game space,
generate second image information based on the information related to the game, a part of or entirety of the second image information being different from first image information that is displayed in the player game space and the second image information including image information and sound information that are not included in the first image information, said second image information including text information including characters or symbols, said sound information including voice chat of a player of the player game space, and
transmit distribution information that includes the second image information,
wherein the distribution server includes
a second processor that is configured to:
receive the distribution information that includes the second image information, and
distribute distributable information that includes some or all of the second image information viewable on a second terminal,
wherein the second processor is further configured to:
refer to a storage device in which a viewing permission level is set for each of a plurality of second terminals that have requested viewing of the game, and select, from the plurality of second terminals, the second terminal on which the some or all of the second image information is viewable, and
distribute the same distribution information to all of the plurality of second terminals for a predetermined period of time, and change the distribution information to be distributed to each of the plurality of second terminals according to the viewing permission level that is set for each of the plurality of second terminals after the predetermined period of time elapses, and
wherein the first terminal and the second terminal are connected to each other via a communication network so as to form a peer-to-peer system.

2. The computer system according to claim 1, wherein the second image information generated by the first processor based on the information related to the game includes a video, a moving image, or a still image of the game.

3. The computer system according to claim 1, wherein the second image information generated by the first processor includes additional information indicating a game situation, the additional information being not included in the first image information.

4. The computer system according to claim 1, wherein the first processor is further configured to generate the sound information based on the information related to the game, a part of or entirety of the sound information being different from first sound information that is output in the player game space, and
the first processor transmits distribution information that includes the second image information and the sound information.

5. The computer system according to claim 1, wherein the first processor is configured to generate the second image information by making a part of the first image information semi-transparent or transparent.

6. The computer system according to claim 1, wherein the first processor is configured to combine a plurality of sounds based on the information related to the game, thereby generating the sound information.

7. A terminal for connection to a distribution server, the terminal comprising:
a first processor that is configured to:
acquire information related to a game played in a player game space; and
generate second image information based on the information related to the game, a part of or entirety of the second image information being different from first image information that is displayed in the player game space and the second image information including image information and sound information that are not included in the first image information, said second image information including text information including characters or symbols, said sound information including voice chat of a player of the player game space; and
transmit distribution information that includes the second image information to the distribution server,
wherein the distribution server includes
a second processor that is configured to:
receive the distribution information that includes the second image information, and
distribute distributable information that includes some or all of the second image information viewable on a second terminal,
wherein the second processor is further configured to:
refer to a storage device in which a viewing permission level is set for each of a plurality of second terminals that have requested viewing of the game, and select, from the plurality of second terminals, the second terminal on which the some or all of the second image information is viewable, and
distribute same distribution information to all of the plurality of second terminals for a predetermined period of time, and change the distribution information to be distributed to each of the plurality of second terminals according to the viewing permission level that is set for each of the plurality of second terminals after the predetermined period of time elapses, and
wherein the terminal and each of the plurality of second terminals are connected to each other via a communication network so as to form a peer-to-peer system.

8. A distribution server for connection to a terminal, the distribution server comprising:
a second processor that is configured to:
receive distribution information that includes second image information, the second image information being generated by the terminal based on information related to a game played in a player game space, and a part of or entirety of the second image information being different from first image information that is displayed in the player game space and the second image information including image information and sound information that are not included in the first image information, said second image information including text information including characters or symbols, said sound information including voice chat of a player of the player game space; and
distribute distributable information that includes some or all of the second image information viewable on another terminal,
wherein the second processor is further configured to:
refer to a storage device in which a viewing permission level is set for each of a plurality of second terminals that have requested viewing of the game, and select, from the plurality of second terminals, the second terminal on which the some or all of the second image information is viewable, and distribute same distribution information to all of the plurality of second terminals for a predetermined period of time, and change the distribution information to be distributed to each of the plurality of second terminals according to the viewing permission level that is set for each of the plurality of second terminals after the predetermined period of time elapses, and wherein the terminal and each of the plurality of second terminals are connected to each other via a communication network so as to form a peer-to-peer system.

* * * * *